March 11, 1947. P. KILHAM 2,417,114
MECHANICAL MOVEMENT FOR INDICATORS
Filed Feb. 28, 1945
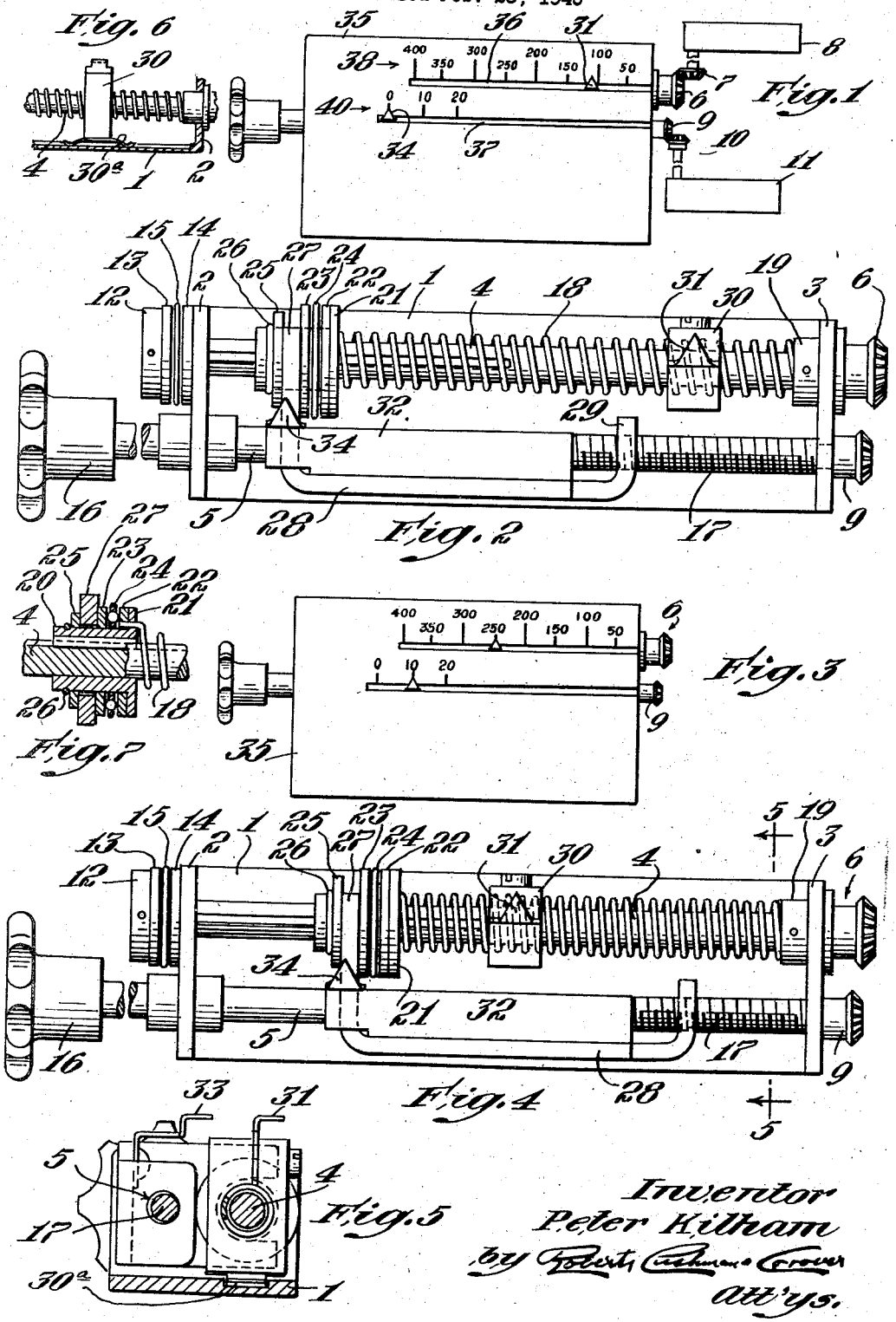
Inventor
Peter Kilham
by Roberts Cushman Grover
Att'ys.

Patented Mar. 11, 1947

2,417,114

UNITED STATES PATENT OFFICE 2,417,114

MECHANICAL MOVEMENT FOR INDICATORS

Peter Kilham, Attleboro, Mass.

Application February 28, 1945, Serial No. 580,189

6 Claims. (Cl. 116—124)

This invention pertains to motion-transmitting mechanism and more particularly to mechanism of the screw-and-nut type, the principal object of the invention being to provide mechanism of this kind in which the effective pitch of the screw may be changed at will thereby to vary the speed ratio between the driving and driven parts. A further object is to provide mechanism of this type having provision for varying the effective speed ratio during the uninterrupted operation of the mechanism. A further object is to provide mechanism of this type which is particularly useful as a correction-applying means. For instance, in association with indicating apparatus of the kind in which a pointer is moved along a graduated scale by a motor device which is sensitively responsive to two different varying conditions, only one of which is to be indicated by the pointer, the mechanism of the present invention makes it possible to insure that the pointer will correctly respond to one condition, regardless of variations in the other condition. A further object is to provide mechanism of this type which is particularly useful in a speed indicator for aeronautical use, thereby to correct the device for barometric changes.

Other and further objects and advantages of the invention will be pointed out in the following more detailed description and by reference to the accompanying drawings wherein Fig. 1 is a fragmentary front elevation of indicating mechanism embodying the present invention;

Fig. 2 is a front elevation, to larger scale than Fig. 1, with the cover and graduated scales removed, illustrating the mechanism of the present invention in detail;

Fig. 3 is a view similar to Fig. 1, but showing the speed-indicating mechanism corrected for a different operating condition;

Fig. 4 is a view similar to Fig. 2, but showing the interior parts arranged to provide for the correction illustrated in Fig. 3;

Fig. 5 is a section substantially on the line 5—5 of Fig. 4;

Fig. 6 is a fragmentary plan view, partly in horizontal section, showing the nut and the means for guiding it; and Fig. 7 is a fragmentary diametrical section through the screw shaft and the spring abutment.

Referring to the drawings, the numeral 1 designates the back member of a rigid frame provided near its opposite ends with forwardly directed parallel brackets 2 and 3 respectively. Conveniently, this frame may be made of a single piece of stiff sheet metal bent to provide the bracket portions 2 and 3. These bracket portions are provided with aligned bearings for the screw shaft 4 and for a parallel adjusting shaft 5. The right-hand end of the shaft 4, as viewed in Figs. 1 and 2, extends beyond the bracket member 3 and is provided with a beveled pinion 6 which engages a pinion 7 carried by a shaft forming a part of and which is turned in one direction or the other by a mechanism 8, for instance a device responsive to variations in air velocity. The shaft 5 also projects beyond the bracket 3 and is furnished with a beveled pinion 9 which meshes with a pinion 10 carried by a shaft forming a part of and which is turned by a mechanism 11, for instance a device responsive to variations in barometric pressure.

The screw shaft 4 also projects to the left of the bracket 2, and is provided at its end with a fixed collar 12. Between this collar 12 and the bracket 2, rings 13 and 14 of wear-resistant material are arranged, with an anti-friction ring 15 interposed between them. These wear rings and the anti-friction ring or bearing interposed between them take up end thrust of the shaft 4. The shaft 5 also extends to the left of the bearing bracket 2 and as here shown is provided with a manually actuable nut or wheel 16 by means of which the shaft 5 may be turned by hand. The right-hand portion of the shaft 5 (just to the left of the bearing bracket 3) is screw threaded, preferably with a thread of fine pitch, as shown at 17.

A helical coiled spring 18 embraces the screw shaft 4 and constitutes a screw thread. The right-hand end of this spring is received in an opening in a collar 19 pinned to the shaft 4 so that this end of the spring is constrained to turn with the shaft. The opposite end of the spring 18 bears against an abutment device comprising a sleeve 20 (Fig. 7) which is keyed to the shaft 4 so as to slide freely along the latter, but is constrained to turn with the shaft. At its right-hand end this sleeve 20 is provided with a radial flange 21 having an opening which receives the left-hand end of the spring 18 so that this end also of the spring is constrained to turn with the shaft 4. Mounted on the sleeve 20 to the left of the flange 21, are wear rings 22 and 23, spaced apart to receive between them an anti-friction ring 24, for example a ball bearing ring. To the left of the ring 23 there is arranged another ring 25 which is prevented from escaping from the sleeve 20 by a spring snap ring 26. The rings 23 and 25 are spaced apart and receive between them a fork 27 (Figs. 2 and 7) formed at the upper end of the left-hand upstanding arm of a carriage 28. This left-hand arm has an opening through which passes the unthreaded portion of the shaft 5. At its opposite end the carriage 28 has an upstanding arm 29 having an internally screw-threaded opening for the reception of the screw-threaded portion 17 of the shaft 5.

A nut member 30 is mounted on the screw shaft 4 and is provided with an internal pin or rib (not shown) which enters between two adjacent turns of the spring 18. As shown in Fig. 6, this nut is provided at its rear side with a spring finger 30ª which slides in a guide groove in the inner face of the back member 1 of the frame. The nut is thus constrained to move axially of the shaft 4 and is prevented from turning with the shaft. A pointer 31 is carried by the nut 30 and, as here illustrated, the carriage 28 is provided with a plate 32 on whose upper edge a pointer 34 is arranged.

As illustrated in Figs. 1 and 3, the operating mechanism is normally housed within a casing 35 having a slot 36 to accommodate the pointer 31 and a second slot 37 to accommodate the pointer 34. A graduated scale 38 cooperates with the pointer 31 and a scale 40 cooperates with the pointer 34.

Assuming that this apparatus is for aeronautical use, and that the scale 38 with its pointer 31, is designed to indicate airplane speed, the mechanism 8 may be of any usual type which will turn the shaft 4 in one direction or the other through an angle corresponding to the relative air velocity, the pointer 31 thus being caused to move along the scale 38. However, the indications of the usual velocity responsive mechanism vary in accordance with the static barometric pressure, and thus if the mechanism 8 properly indicate air velocity or airplane speed at a low level, the reading may be incorrect when the plane is flying at a high level. As the barometric pressure changes, the mechanism 11 will turn the shaft 17 and thus move the carriage 28, thereby changing the position of the abutment element 21 and thus varying the length of the spring 18. Such variation in length changes the spacing of the spring coils, or in other words, changes the pitch of the screw with which the nut 30 cooperates. By proper design of the parts the barometric mechanism 11 (responding to barometric change) may thus be caused so to vary the pitch of the screw formed by the spring 18 that the reading of the pointer 31 will be correct at any height at which the airplane may be flying. The scale 40 may be graduated to indicate barometric pressure or to indicate height, as may be desired. It is contemplated as within the scope of the invention to omit the automatic barometric responsive mechanism 11 and to move the carriage 28 solely by manual manipulation of the nut or hand wheel 16. In this event the operator will first observe the reading of a suitable instrument indicating height or barometric pressure and will then turn the hand wheel 16 so as to move the pointer 34 to a corresponding part of the scale 40.

While the mechanism has here been illustrated for specific example of its utility in connection with speed-indicating means for airplane or similar use, it is evident that it may be applied to other specific uses. For instance, if in place of the speedometer some type of moisture-indicating or hygrometer apparatus were employed whose indications might be affected by temperature change, the part 11 hereinabove described might be replaced by a temperature-responsive mechanism which would make the necessary corrections so that the pointer and scale would properly indicate the moisture content of the atmosphere. In this latter use of the apparatus the device 11 might be dispensed with and temperature corrections made by turning the hand wheel 16 with a corresponding graduation of the scale 40. Furthermore, it is obvious that the variable pitch screw herein disclosed may be found of utility in many other situations and is not necessarily limited in its use to indicating apparatus.

While a desirable construction has been illustrated and described, it is to be understood that the invention is not necessarily limited to this precise construction, but is broadly inclusive of any and all modifications falling within the scope of the appended claims.

I claim:

1. Mechanism of the class described comprising a frame having spaced aligned bearings, a screw shaft arranged to turn in said bearings, an elongate coil spring embracing the shaft between the bearings, a collar fixed to the shaft to which one end of the spring is anchored, an abutment keyed to the shaft and movable axially of the latter and to which the other end of the spring is anchored, a nut engaging the coils of the spring, means operative to prevent the nut from turning with the shaft, a carriage movable in a path parallel to the screw shaft, a part of the carriage being operatively connected to the axially movable abutment whereby movement of the carriage varies the length of the spring, and means for moving the carriage.

2. Mechanism of the class described comprising a rigid frame having spaced parallel bearing brackets, a screw shaft turning in bearings in the respective brackets, means secured to one end of the shaft whereby it may be turned, a coil spring embracing the shaft between the bearings, means anchoring one end of the spring to the shaft, an abutment keyed to turn with and to move axially of the shaft, the other end of the spring being anchored to said abutment, an adjusting rod parallel to the shaft, spaced from the latter and arranged to turn in bearings in the frame brackets, a carriage supported by the rod, the carriage having a fork which engages a groove in the abutment, the rod having screw-threaded engagement with the carriage whereby rotation of the rod moves the carriage and thereby varies the length of the spring, and a nut engaging the spring coils, the frame having a guide portion which is engaged by a part carried by the nut thereby to prevent rotation of the nut.

3. Apparatus of the class described comprising a pair of rotary shafts designed to be turned respectively by independent motor means, a helical spring embracing and turning with the first shaft and constituting a screw thread of variable pitch, a nut cooperating with said screw thread and movable axially of said first shaft by rotation of the latter, a pointer carried by the nut, and means providing a graduated scale cooperable with the pointer, an abutment for one end of the spring, means carried by the second shaft for moving said abutment thereby to vary the pitch of the screw thread, a pointer movable with the abutment, and means providing a graduated scale cooperable with the latter pointer.

4. Apparatus of the class described comprising a pair of shafts designed to be turned respectively by independent motor means, the first shaft being provided with a screw thread of variable pitch, a nut cooperable with said screw thread, means responsive to rotation of the second shaft for varying the pitch of the screw thread, a pointer connected to the nut, and means providing a graduated scale cooperable with the pointer.

5. Mechanism of the class described comprising a nut and a rotatable screw shaft having a helical thread engaging the nut, the helical thread being of variable pitch, a carriage movable in a path parallel to the screw shaft, means for moving the carriage, means responsive to motion of the carriage for varying the pitch of the screw thread, a pointer carried by the nut, a pointer mounted on the carriage, and means providing graduated scales with which the respective pointers cooperate.

6. Mechanism of the class described comprising a rotatable screw shaft having a helical thread and a nut engaging the thread, a coiled spring embracing the shaft and turning with the latter and constituting the screw thread, means operative to prevent rotation of the nut whereby rotation of the shaft moves the nut axially of the shaft, a carriage movable in a path parallel to the screw shaft, means for moving the carriage, means responsive to movement of the carriage for varying the effective length of the coiled spring, a pointer carried by the nut, a second pointer moving with the carriage, and means providing graduated scales with which the respective pointers cooperate.

PETER KILHAM.

REFERENCES CITED

The following references are of record in the file of this patent:

UNITED STATES PATENTS

| Number | Name | Date |
|---|---|---|
| 1,773,309 | Hugershoff | Aug. 19, 1930 |
| 1,492,266 | Ray | Apr. 29, 1924 |
| 1,854,555 | Mendola | Apr. 19, 1932 |
| 1,319,408 | Marty | Oct. 21, 1919 |
| 2,251,498 | Schwein | Aug. 5, 1941 |
| 2,295,586 | Little | Sept. 15, 1942 |
| 2,222,551 | Ziebolz et al. | Nov. 19, 1940 |
| 2,367,431 | Reece | Jan. 16, 1945 |